(12) United States Patent
Godon et al.

(10) Patent No.: US 11,117,287 B2
(45) Date of Patent: *Sep. 14, 2021

(54) METHOD OF IMPREGNATING A FIBER TEXTURE OF HOLLOW SHAPE

(71) Applicants: SAFRAN AIRCRAFT ENGINES, Paris (FR); SAFRAN, Paris (FR)

(72) Inventors: Thierry Godon, Moissy-Cramayel (FR); Michaël Podgorski, Moissy-Cramayel (FR)

(73) Assignees: SAFRAN AIRCRAFT ENGINES, Paris (FR); SAFRAN, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/573,012

(22) PCT Filed: May 23, 2016

(86) PCT No.: PCT/FR2016/051214
§ 371 (c)(1),
(2) Date: Nov. 9, 2017

(87) PCT Pub. No.: WO2016/193569
PCT Pub. Date: Dec. 8, 2016

(65) Prior Publication Data
US 2018/0126591 A1    May 10, 2018

(30) Foreign Application Priority Data

Jun. 4, 2015   (FR) ...................................... 1555090

(51) Int. Cl.
*B28B 23/00* (2006.01)
*B28B 1/20* (2006.01)
(Continued)

(52) U.S. Cl.
CPC .......... *B28B 23/0006* (2013.01); *B05D 1/002* (2013.01); *B28B 1/20* (2013.01);
(Continued)

(58) Field of Classification Search
CPC ........... B28B 1/20; B28B 21/30; B29C 41/04; B29C 70/025; B29C 70/323;
(Continued)

(56) References Cited

U.S. PATENT DOCUMENTS 2,166,175 A * 7/1939 Porter ..................... B28B 21/32
264/71
2,170,931 A * 8/1939 Schafer ................... B29B 11/06
264/246

(Continued)

FOREIGN PATENT DOCUMENTS

CN      101628822 A    1/2010
DE      42 38 878 A1   5/1993
(Continued)

OTHER PUBLICATIONS

International Search Report as issued in International Patent Application No. PCT/FR2016/051214, dated Sep. 1, 2016.
(Continued)

*Primary Examiner* — Michael M. Robinson
(74) *Attorney, Agent, or Firm* — Pillsbury Winthrop Shaw Pittman LLP

(57) ABSTRACT

A method of impregnating a fiber texture of hollow shape, the method including introducing a first suspension containing a first powder of solid particles of ceramic or carbon material into an inside volume defined by an inside face of a fiber texture of hollow shape placed in a mold, an outer face of the fiber texture being presented facing a wall of the mold; and using the action of centrifugal force to impregnate the fiber texture with the first suspension by causing the (Continued)

mold to rotate and varying the speed of rotation of the mold during the impregnation of the texture with the first suspension.

13 Claims, 3 Drawing Sheets

(51) Int. Cl.
| | | |
|---|---|---|
| *B28B 1/32* | (2006.01) | |
| *B05D 1/00* | (2006.01) | |
| *B28B 21/30* | (2006.01) | |
| *B29C 70/02* | (2006.01) | |
| *B29C 70/32* | (2006.01) | |
| *C04B 35/626* | (2006.01) | |
| *B29C 41/04* | (2006.01) | |
| *C04B 35/117* | (2006.01) | |
| *C04B 35/573* | (2006.01) | |
| *C04B 35/80* | (2006.01) | |
| *B28B 11/24* | (2006.01) | |
| *C04B 35/628* | (2006.01) | |
| *C04B 35/64* | (2006.01) | |
| *B29C 41/36* | (2006.01) | |

(52) U.S. Cl.
CPC ............ *B28B 1/32* (2013.01); *B28B 11/243* (2013.01); *B28B 21/30* (2013.01); *B29C 41/04* (2013.01); *B29C 70/025* (2013.01); *B29C 70/323* (2013.01); *C04B 35/117* (2013.01); *C04B 35/573* (2013.01); *C04B 35/6263* (2013.01); *C04B 35/62852* (2013.01); *C04B 35/64* (2013.01); *C04B 35/80* (2013.01); *B05D 2254/04* (2013.01); *B29C 41/042* (2013.01); *B29C 41/365* (2013.01); *C04B 2235/3217* (2013.01); *C04B 2235/422* (2013.01); *C04B 2235/5224* (2013.01); *C04B 2235/5248* (2013.01); *C04B 2235/5252* (2013.01); *C04B 2235/5256* (2013.01); *C04B 2235/602* (2013.01); *C04B 2235/606* (2013.01); *C04B 2235/616* (2013.01); *C04B 2235/75* (2013.01); *C04B 2235/775* (2013.01)

(58) Field of Classification Search
CPC ... B29C 41/042; B29C 41/365; C04B 35/117; C04B 35/573; C04B 35/6263; C04B 35/62852; C04B 35/64; C04B 35/803; C04B 35/806; C04B 2235/3217; C04B 2235/422; C04B 2235/5224; C04B 2235/5248; C04B 2235/5252; C04B 2235/5256; C04B 2235/602; C04B 2235/606; C04B 2235/616; C04B 2235/75; C04B 2235/775; B05B 1/046; B05B 5/0411
See application file for complete search history.

(56) References Cited

U.S. PATENT DOCUMENTS

| | | | | |
|---|---|---|---|---|
| 4,092,953 | A | * | 6/1978 | Waugh ............... B05B 1/14 118/302 |
| 4,994,418 | A | | 2/1991 | Yamakawa et al. |
| 5,025,849 | A | | 6/1991 | Karmarkar et al. |
| 5,453,230 | A | | 9/1995 | McClellan |
| 6,497,776 | B1 | | 12/2002 | Butler et al. |
| 2010/0015332 | A1 | | 1/2010 | Rollin et al. |
| 2010/0144227 | A1 | * | 6/2010 | Coupe ............... B29C 70/24 442/207 |
| 2011/0168092 | A1 | * | 7/2011 | Clark ............... B05D 1/30 118/641 |

FOREIGN PATENT DOCUMENTS

| | | | |
|---|---|---|---|
| DE | 10 2009 011585 A1 | | 9/2010 |
| EP | 0 240 177 A2 | | 10/1987 |
| EP | 2 181 974 A1 | | 5/2010 |
| GB | 798 045 A | | 7/1958 |
| GB | 2264719 A | * | 9/1993 ......... B05B 13/0645 |
| JP | S62-230680 A | | 10/1987 |
| JP | 2002-020965 A | | 1/2002 |
| WO | WO 2006/136755 A2 | | 12/2006 |

OTHER PUBLICATIONS

International Preliminary Report on Patentability and the Written Opinion of the International Searching Authority as issued in International Patent Application No. PCT/FR2016/051214, dated Dec. 5, 2017.
Notice of Reasons for Refusal as issued in Japanese Patent Application No. 2017-562023, dated May 12, 2020.
Office Communication as issued in European Patent Application No. 16731221.4, dated Apr. 2, 2020.

\* cited by examiner

METHOD OF IMPREGNATING A FIBER TEXTURE OF HOLLOW SHAPE

CROSS REFERENCE TO RELATED APPLICATIONS

This application is the U.S. National Stage of PCT/FR2016/051214 filed May 23, 2016, which in turn claims priority to French Application No. 1555090, filed Jun. 4, 2015. The contents of both applications are incorporated herein by reference in their entirety.

BACKGROUND OF THE INVENTION

The invention relates to a method of impregnating a fiber texture of hollow shape.

Composite materials, and in particular oxide/oxide composites can be prepared in conventional manner by stacking pre-impregnated plies obtained by two-dimensional weaving. Nevertheless, that type of method can lead to obtaining composite materials that are stratified and sensitive to the delamination phenomenon when subjected to mechanical stress.

In order to improve the ability of composite materials to withstand delamination, attempts have been made to avoid obtaining interfaces between the two-dimensional plies and possibly to use one or more three-dimensional woven fabrics instead of two-dimensional woven fabrics. It has been envisaged that the matrix could be formed by introducing refractory solid particles into the fiber reinforcement followed by sintering those particles. In order to introduce refractory particles into the fiber reinforcement, various known methods have been performed, such as submicron powder suction (SPS). In such methods, the refractory particles are introduced into the fiber reinforcement from a slurry comprising in particular the powder of refractory particles in suspension in a liquid medium, the slurry possibly also including an organic binder and a dispersing agent.

Nevertheless, it has been found that those methods cannot provide results that are entirely satisfactory when the fiber reinforcement is complex in shape, in particular when it presents a hollow shape, or is of great thickness. Specifically, those methods can then be relatively lengthy and difficult to perform in order to obtain the desired distribution of refractory particles inside the fiber reinforcement. In particular, for a part that is of hollow conical shape, and, in order to avoid creasing the woven fabric that is used, it can be necessary to have recourse to tooling that is relatively complex and that is made up of a plurality of portions, together with complex sequences for preparing for molding and unmolding.

Also known is Document EP 0 240 177, which describes a method of fabricating a part out of composite material.

There thus exists a need to have a method of treating a fiber texture of hollow shape that makes it possible in simple manner to obtain a distribution of solid refractory particles inside said texture that is controlled, and consequently to obtain a composite material part that presents the desired properties.

In particular, there exists a need to have a method of treating a fiber texture of hollow shape that makes it possible in simple manner to obtain a distribution of refractory solid particles inside said texture that is uniform.

OBJECT AND SUMMARY OF THE INVENTION

To this end, in a first implementation, the invention provides a method of impregnating a fiber texture of hollow shape, the method comprising at least the following steps:

introducing a first suspension containing a first powder of solid particles of ceramic or carbon material into an inside volume defined by an inside face of a fiber texture of hollow shape placed in a mold, an outer face of the fiber texture being presented facing a wall of the mold; and using the action of centrifugal force to impregnate the fiber texture with the first suspension by causing the mold to rotate and varying the speed of rotation of the mold during the impregnation of the texture with the first suspension.

In addition, in a second implementation, the invention provides a method of impregnating a fiber texture of hollow shape, the method comprising at least the following steps:

introducing a first suspension containing a first powder of solid particles of ceramic or carbon material into an inside volume defined by an inside face of a fiber texture of hollow shape placed in a mold, an outer face of the fiber texture being presented facing a wall of the mold;

using the action of centrifugal force to impregnate the fiber texture with the first suspension by causing the mold to rotate;

after the fiber texture has been impregnated with the first suspension, introducing a second suspension into the inside volume, the second suspension including solid particles of ceramic or carbon material, and being different from the first suspension; and using the action of centrifugal force to impregnate the fiber texture with the second suspension by causing the mold to rotate, the impregnation of the texture with the first suspension and the impregnation of the texture with the second suspension being performed at different speeds of rotation of the mold.

The second powder may be different from the first powder. Thus, the material constituting the particles of the second powder in a particular implementation may be different from the material constituting the particles of the first powder. In a variant, the mean size of the particles of the first powder may be different from the mean size of the particles of the second powder. Unless specified to the contrary, the term "mean size" is used to designate the size given by the half population statistical particle size distribution, written D50. It is also possible for the first and second powders to differ in terms of the size distribution of the particles. In another variant, the particles of the first powder may be of a shape that is different from the particles of the second powder. In a variant or in combination, the concentration of solid particles of the first powder in the first suspension may be different from the concentration of solid particles of the second powder in the second suspension.

In the first and second above-described implementations, causing the mold to rotate causes centrifugal force to be applied to the first suspension, enabling the fiber texture to be impregnated with the first suspension. In addition, in the second above-described implementation, the rotation of the mold causes a centrifugal force to be applied to the second suspension, enabling the fiber texture already containing particles of the first powder to be impregnated with the second suspension.

Both implementations of the invention enable a fiber texture to be impregnated with at least one suspension of solid particles of ceramic or carbon material under the action of the centrifugal force generated by rotation of the mold while varying the speed of rotation of the mold during impregnation.

In both above-described implementations, the fact of varying the speed of rotation of the mold during impregnation makes it possible in satisfactory manner to control the distribution of particles in the hollow fiber texture, and in particular to obtain a uniform distribution of particles when that is desired, with this applying even for a texture of considerable thickness or presenting permeability that varies across its thickness. Unlike the situation in which the fiber texture is impregnated with centrifuging a continuous phase such as a resin, impregnating a fiber texture with a suspension of solid particles presents an additional difficulty associated with the ability to transport the particles of the suspension through the array of pores in the fiber texture. Although it is possible to obtain a satisfactory result when using centrifugal force to impregnate a fiber texture with a resin while imposing a constant speed of rotation to the mold during impregnation, results of such quality are not always obtained when resin is replaced by a suspension of particles, in particular when the texture presents thickness that is relatively great. The invention thus proposes a solution for solving the specific problem of impregnating a fiber texture with one or more suspensions of solid particles, the solution lying in the fact that the speed of rotation of the mold is varied during impregnation of the fiber texture with the suspension(s).

In an example of the first implementation, the texture may be impregnated with the first suspension by initially imparting a first constant speed of rotation to the mold and then subsequently imparting a second constant speed of rotation to the mold, the second speed of rotation being different from the first speed of rotation.

Under such circumstances, the fiber texture is impregnated with the first suspension by initially setting the speed of rotation of the mold at a first non-zero value, and then by causing the speed of rotation of the mold to vary so as to set it subsequently at a second non-zero value that is different from the first value.

This example makes it possible to impregnate a first zone of the thickness of the fiber texture mostly with the first suspension during a first stage of impregnation in which the mold is rotating at the first speed of rotation, and to impregnate a second zone of the thickness of the fiber texture mostly with the first suspension during a second stage of impregnation in which the mold is rotating at the second speed of rotation. The first and second zones may be disjoint or they may overlap in part.

The term "impregnating a zone of the thickness of a fiber texture mostly with a suspension during a stage of impregnation" should be understood as meaning that more than 50%, e.g. at least 75%, of the particles of said suspension that penetrate into the fiber texture during said stage of impregnation end up being present in said zone at the end of the stage of impregnation.

In an example, in the first implementation, the first speed of rotation may be higher than the second speed of rotation.

Such an example is advantageous in particular when it is desired to impregnate a relatively thick texture in uniform manner. Specifically, the fact of applying a "high" first speed of rotation makes it possible to impart sufficient centrifugal force to the particles to ensure that they migrate through the array of pores into an outer zone of the thickness of the texture, and the fact of applying a "low" second speed of rotation by reducing the centrifugal force applied to the particles makes it possible to impregnate mostly an inner zone of the thickness of the texture. This example may also be advantageous with a fiber texture of permeability that varies, presenting low permeability in an inner zone of its thickness. It is then advantageous to begin by applying a "high" speed of rotation in order to impart sufficient centrifugal force to the particles to enable them to pass through the inner zone of low permeability and thus migrate into the outer zone of the thickness of the texture, with the speed of rotation then being reduced in order to fill the inner zone of the thickness of the texture with particles.

In a variant, in the first implementation, the second speed of rotation may be higher than the first speed of rotation.

In another example, in the first implementation, throughout the impregnation of the fiber texture with the first suspension, the speed of rotation of the mold does not present any dwell period at a constant value. Under such circumstances, the speed of rotation may for example be strictly increasing or strictly decreasing throughout the impregnation of the fiber texture with the first suspension.

In an example of the second implementation, the texture may be impregnated with the first suspension by imparting a first constant speed of rotation to the mold, and the texture may subsequently be impregnated with the second suspension by imparting a second constant speed of rotation to the mold, the second speed of rotation being different from the first speed of rotation.

Under such circumstances, the fiber texture is impregnated with the first suspension by setting the speed of rotation of the mold at a first non-zero value, and then the fiber texture is subsequently impregnated with the second suspension by setting the speed of rotation of the mold at a second non-zero value that is different from the first value.

This example enables a first zone of the thickness of the fiber texture to be impregnated mostly with the first suspension during a first stage of impregnation during which the mold rotates at the first speed of rotation, and a second zone of thickness of the fiber texture to be impregnated mostly with the second suspension during a second stage of impregnation in which the mold rotates at the second speed of rotation, the second zone being different from the first zone. The first and second zones may be disjoint or they may overlap in part.

In an example, in the second implementation, the first speed of rotation may be higher than the second speed of rotation.

As explained above in the context of the first implementation, such an example is advantageous in particular when it is desired to impregnate uniformly a relatively thick texture or a texture of varying permeability presenting low permeability in an inner zone of its thickness with powders that differ in particular in terms of the material constituting the solid particles or the mean size of the solid particles.

In a variant, in the second implementation, the second speed of rotation may be higher than the first speed of rotation.

In another example, in the second implementation, throughout the impregnation of the fiber texture with the first and second suspensions, the speed of rotation of the mold does not present any dwell period at a constant value. Under such circumstances, and by way of example, the speed of rotation of the mold may be strictly increasing or strictly decreasing throughout the impregnation of the fiber texture with the first and second suspensions.

In an example, the direction of rotation of the mold may be reversed one or more times during impregnation of the fiber texture with the first suspension and/or during impregnation of the fiber texture with the second suspension.

Such an example is advantageous for ensuring that the distribution of particles within the fiber texture is uniform, when so desired.

In a variant, the speed of rotation of the mold need not be modified throughout the impregnation of the fiber texture with the first suspension and/or throughout the impregnation of the fiber texture with the second suspension.

In an example, the first and/or second suspension may be introduced into the inside volume by spraying, e.g. by using one or more spray devices driven to move in translation and/or in rotation during spraying.

In an example, the fiber texture may be axisymmetric.

By way of example, the fiber texture may be frustoconical in shape. In a variant, the fiber texture may be cylindrical in shape.

In an example, the fiber texture may be obtained by two-dimensional weaving or by three-dimensional weaving.

The fiber texture may include yarns made of ceramic or of carbon material. In particular, the fiber texture may include ceramic yarns of refractory oxide and the particles of the first powder and/or the particles of the second powder may be ceramic particles of refractory oxide.

The present invention also provides a method of fabricating a composite material part, the method comprising the following steps:
impregnating the fiber texture with at least the first suspension by performing a method as described above;
eliminating at least the liquid medium of the first suspension impregnating the fiber texture; and
forming a matrix phase densifying the fiber texture at least from the particles of the first powder in order to obtain the composite material part.

The composite material part as obtained in this way may be a tube, a casing, or a turbine ring.

In an example, the matrix phase may be formed in full or in part by sintering the particles of the first powder. Once the part has been obtained, it may be subjected in conventional manner to a step of machining in order to give it the desired dimensions and/or to a step of coating by at least one coating in order to provide a thermal barrier or an environmental barrier, for example.

BRIEF DESCRIPTION OF THE DRAWINGS

Other characteristics and advantages of the invention appear from the following description of particular implementations of the invention, which are given as non-limiting examples and with reference to the accompanying drawings, in which.

In the figures, the relative dimensions of the various elements are not necessarily complied with for reasons of readability.

DETAILED DESCRIPTION OF IMPLEMENTATIONS

Examples of means suitable for use in forming the fiber texture that is to be used in the context of a method of the invention are described below.

The fiber texture may be obtained by multilayer weaving between a plurality of layers of warp yarns and a plurality of layers of weft yarns. The multilayer weaving may in particular be performed with an "interlock" weave, i.e. a weave in which each layer of weft yarns interlinks a plurality of layers of warp yarns, with all of the yarns in a given weft column having the same movement in the plane of the weave. Other types of multilayer weaving could naturally be used.

When the fiber texture is made by weaving, the weaving may be performed with warp yarns extending in the longitudinal direction of the fiber texture, it being understood that weaving with weft yarns extending in the longitudinal direction is also possible.

In an implementation, the yarns used may be ceramic yarns made of refractory oxide, yarns made of silicon carbon, or yarns made of carbon. Various suitable techniques of multilayer weaving are described in Document WO 2006/136755.

The fiber yarn may also be obtained by assembling at least two fiber structures. Under such circumstances, the two fiber structures may be linked together, e.g. by stitching or by needling. Specifically, the fiber structures may each be obtained from a layer or a stack of a plurality of layers of:
unidimensional fabric (UD);
two-dimensional fabric (2D);
braiding;
knitting;
felt;
a unidirectional (UD) sheet of yarns or tows, or multidirectional (nD) sheets obtained by superposing a plurality of UD sheets in different directions and linking together the UD sheets, e.g. by stitching, by a chemical bonding agent, or by needling.

With a stack of a plurality of sheets, they may be linked together by stitching, by implanting yarns or rigid elements, or by needling, for example.

Figure 1:
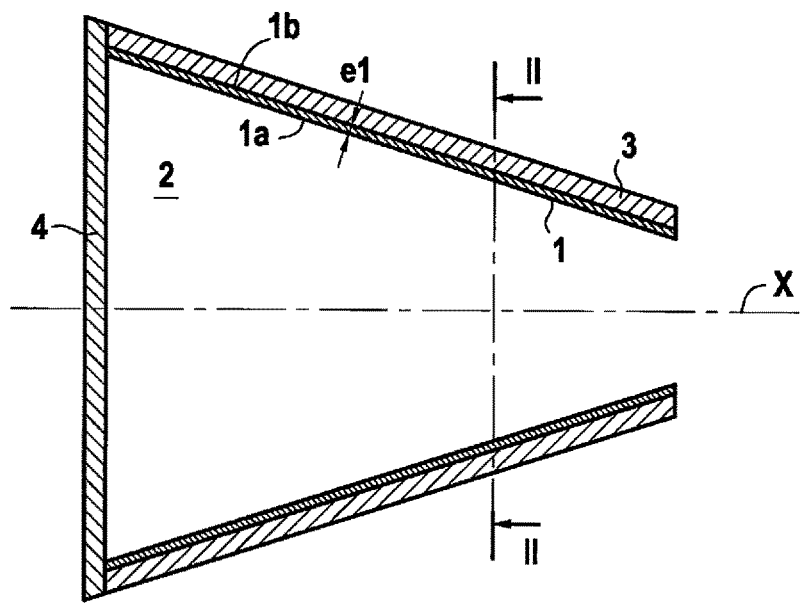
FIG. 1 shows a hollow fiber texture placed in a mold in order to be treated by a method of the invention.
Figure 2:
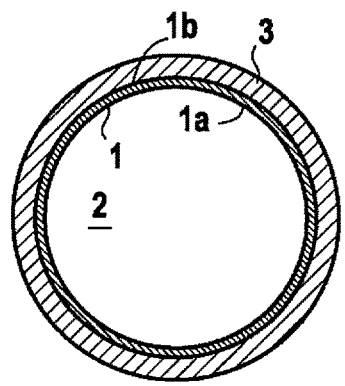
FIG. 2 is a section on II-II of FIG. 1.

Once the hollow texture 1 has been fabricated, it is then placed in a mold, positioning the outside face 1b of the texture 1 facing a side wall 3 of the mold, as shown in FIGS. 1 and 2. As shown, the fiber texture 1 is hollow and defines an inside volume 2. In the example shown, the mold together with the texture 1 are of axisymmetric shape, specifically of frustoconical shape. It would not go beyond the ambit of the invention for the mold and the texture to have some other shape, e.g. such as a cylindrical shape. The inside face 1a of the texture 1 present in the mold defines an inside volume 2 into which one or more suspensions are to be introduced. Prior to performing the impregnation step, the texture 1 present in the mold may be dry and may possibly not contain any solid particles in its internal pores. In a variant, prior to being placed in the mold, the texture 1 may be subjected to a prior impregnation step leading to solid particles being introduced into its internal pores. Once the texture 1 has been introduced into the mold, the mold is closed at one of its ends by an end wall 4. The texture 1 may be introduced into the mold manually. Once the texture 1 has been introduced into the mold, it is held in position in the mold, e.g. by fastening the edges of the texture to the mold, where such fastening may be performed by separate fittings such as screws, or by adhesive. It is also possible to hold the texture 1 in place in the mold by means of a perforated hollow central core that is positioned facing the inside face 1a of the texture 1. The central core presents a plurality of perforations allowing a liquid medium to pass through it in order to impregnate the texture 1.

The thickness $e_1$ of the texture 1 may be greater than or equal to 0.5 millimeters (mm), e.g. lying in the range 0.5 mm to 10 mm. The thickness of a fiber texture corresponds to its smallest transverse dimension.

The mold is connected to a system for rotating it (not shown) enabling the mold to be rotated about the axis of rotation X, which, in the example shown, also corresponds to the longitudinal axis of the texture 1.

Figure 3:
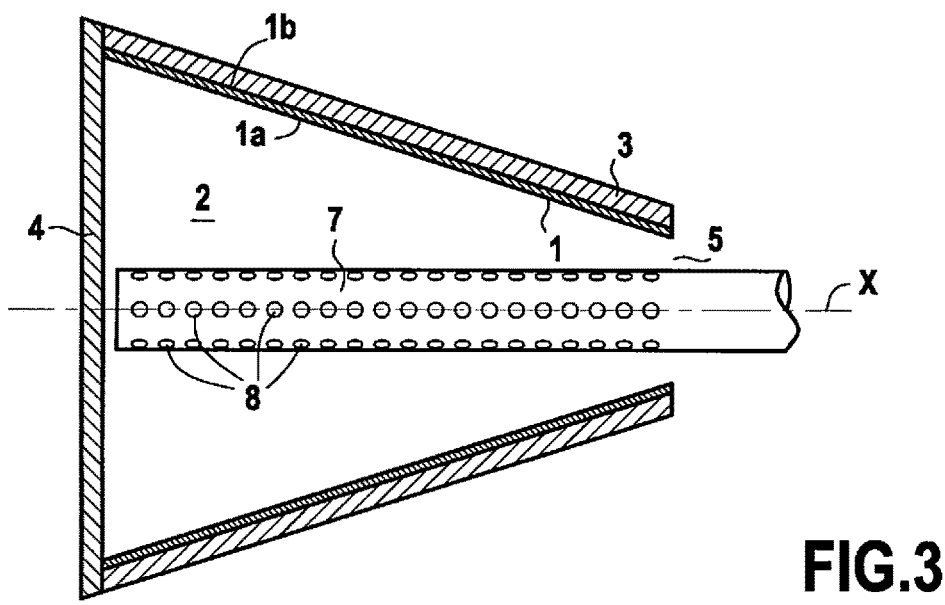
FIG. 3 shows the mold of FIGS. 1 and 2 fitted with a spray device for enabling a suspension of solid particles to be introduced into the inside volume.

Once the texture 1 has been placed in the mold, a spray device 7 for spraying a suspension of solid particles is then introduced into the mold via the end 5 of the mold that is situated remote from the end wall 4, as shown in FIG. 3. In its surface, the spray device 7 presents a plurality of orifices 8 through which a suspension of solid particles is to be introduced into the inside volume 2.

Figure 4:
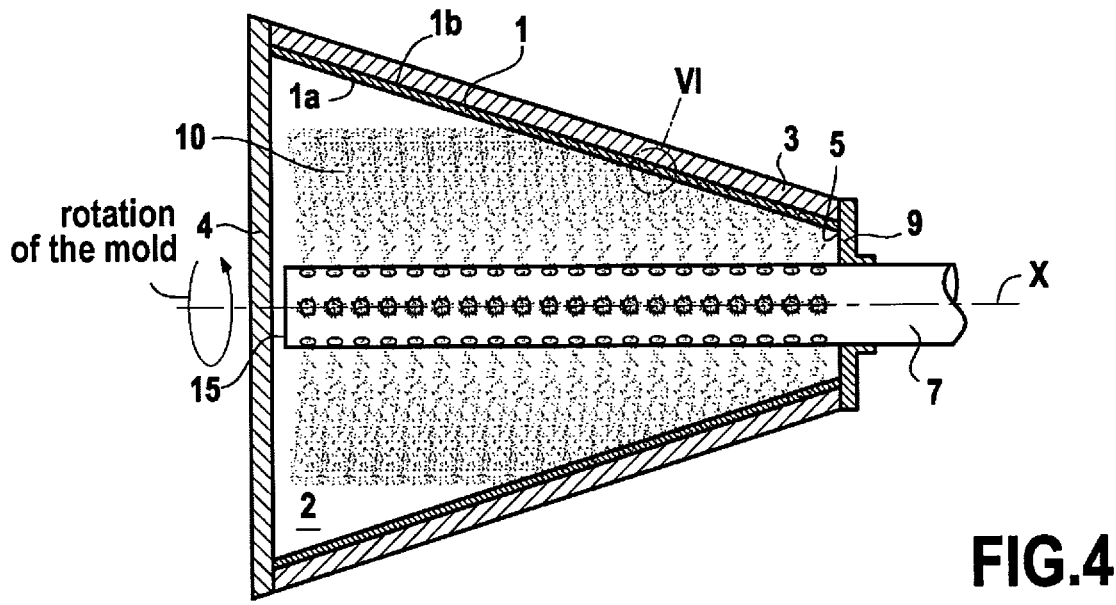
FIG. 4 shows an example of a step of impregnating the fiber texture as implemented in the context of a method of the invention.

In order to impregnate the texture 1, the mold is closed at its end 5 by a cover 9. Thereafter, a first suspension 10 comprising a first powder of solid particles made of ceramic or carbon material in suspension in a liquid medium is introduced into the inside volume 2, as shown in FIG. 4. In the example shown, the first suspension 10 is introduced into the inside volume 2 by spraying using the spray device 7. In the context of the second implementation of the invention, the spray device 7 begins by spraying the first suspension into the inside volume 2 followed by spraying the second suspension. The second suspension comprises a second powder of solid particles made of ceramic or carbon material in suspension in a liquid medium, the second suspension being different from the first suspension. Thus, as explained above, the material constituting the particles of the second powder may be different from the material constituting the particles of the first powder and/or the first and second suspensions may present different concentrations of solid particles. Variants other than that shown in FIG. 4 are possible for the purpose of introducing at least one suspension of solid particles into the inside volume 2, as described in greater detail below. The mold is set into rotation at a non-zero speed of rotation about the axis of rotation X in order to impregnate the texture 1 with at least the first suspension 10 by the action of centrifugal force. Rotation of the mold may be started before the first suspension 10 is introduced into the inside volume 2.

Figure 5:
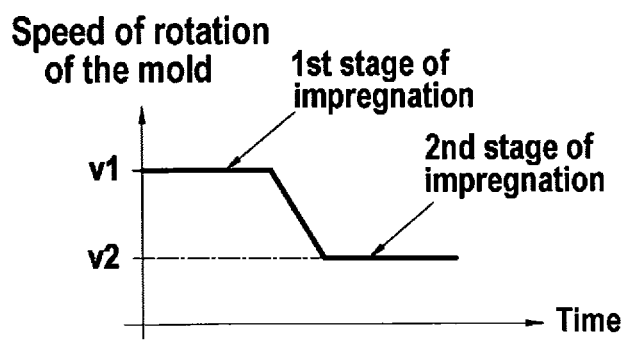
FIG. 5 is a graph showing how the speed of rotation of the mold varies during the impregnation step shown in FIG. 4.
Figure 6:
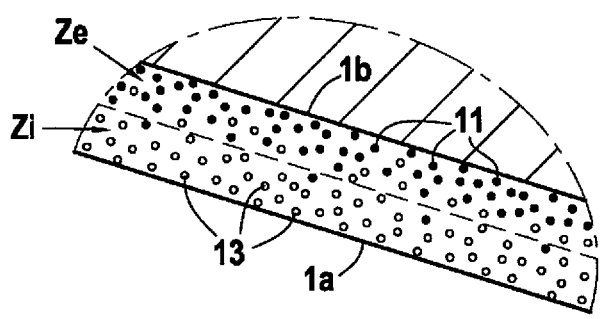
FIG. 6 is a highly diagrammatic view of a result that can be obtained after impregnation in the context of the second implementation of the invention.

In the context of the first and second implementations of the invention, the speed of rotation of the mold is modified while impregnation is taking place. The graph of FIG. 5 shows one possible way in which the speed of rotation applied to the mold may vary. Thus, during a first stage of impregnation, the mold may be caused to rotate at a constant first speed of rotation $v_1$, with the speed of rotation of the mold then subsequently being reduced continuously to a second speed of rotation $v_2$, and with a second stage of impregnation then being performed during which the speed of rotation of the mold is maintained at the value $v_2$. The duration of the first stage of impregnation may be greater than, equal to, or less than the duration of the second stage of impregnation. As explained above, varying the speed of rotation of the mold in this way in the context of the first implementation enables the texture 1 to be impregnated with the particles of the first powder in uniform manner. It is also possible to use the profile for varying the speed of rotation of the mold as shown in FIG. 5 in the context of the second implementation of the invention. Under such circumstances, during the first stage of impregnation, it is possible to impregnate mostly an outer zone $Z_e$ of the thickness of the texture 1 with the first suspension, and during the second stage of impregnation, it is possible to impregnate mostly an inner zone $Z_i$ of the thickness of the texture 1 with the second suspension. FIG. 6 shows the result that can be obtained under such circumstances. FIG. 6 shows that the outer zone $Z_e$ of the texture 1 has been impregnated mostly with the particles 11 of the first powder, and that the inner zone $Z_i$ of the texture 1 has been impregnated mostly with the particles 13 of the second powder.

Naturally, in both the first and the second implementations of the invention, it is possible for the speed of rotation of the mold to vary in manners other than that shown in FIG. 5. In particular, it is possible to have more than two dwell periods at constant speed, possibly with an increase in the speed of rotation of the mold to a third value greater than $v_2$ after the second stage of impregnation. In a variant, the first speed imparted during the first stage of impregnation may be less than the second speed imparted during the second stage of impregnation. Modifying the profile for the speed of rotation imparted to the mold serves to control how impregnation is performed and consequently to obtain a predetermined distribution of particles in the fiber texture. In particular, it is thus possible to obtain impregnation/distribution that is uniform, or impregnation/distribution that is non-uniform with controlled variation in the distribution of solid particles across the thickness of the texture.

Independently of the profile used for varying the speed of rotation of the mold, it is possible, in the context of the first implementation of the invention, to impregnate the texture 1 with the first suspension until it is saturated (i.e. completely full). Under such circumstances, rotation of the mold is stopped after the texture has been filled completely.

Independently of the profile used for varying the speed of rotation of the mold, in the context of the second implementation of the invention, it is possible to impregnate the texture 1 until it is saturated with the first suspension and with the second suspension. Under such circumstances, the rotation of the mold is stopped after the texture has been filled completely.

Independently of the profile used for varying the speed of rotation of the mold and independently of the implementation of the invention under consideration, the spray device 7 may be driven to move in translation along the axis of rotation X while impregnating the texture 1. The end 5 of the spray device 7 can thus perform a plurality of go-and-return strokes between two distinct positions that are spaced apart along the axis of rotation X. Independently of, or in combination with, this movement in translation as described above, the spray device 7 may also be driven to move in rotation during impregnation of the texture 1. Under such circumstances, the spray device 7 may rotate in the same direction of rotation as the mold, or in the opposite direction, at the same speed of rotation as the mold, or at a different speed of rotation. Imparting movement in translation and/or rotation to the spray device 7 can serve advantageously to further improve the uniformity of the impregnation that is performed. In a variant, the spray device 7 remains stationary throughout impregnation of the texture.

In an implementation, the direction of rotation of the mold and/or of the spray device 7 may be reversed one or more times during impregnation.

By way of example, the speed of rotation imparted to the mold throughout all or part of impregnation of the texture with the first suspension and/or with the second suspension may be greater than or equal to one revolution per minute (rpm), e.g. lying in the range 1 rpm to 5000 rpm.

The viscosity of the first suspension and/or of the second suspension may be about 30 millipascal seconds (mPa·s) when measured using a Brookfield type viscometer at a temperature of 20° C.

The volume content of solid particles in the first suspension and/or in the second suspension may be less than or equal to 40%. The volume content of solid particles in the first suspension and/or in the second suspension may be greater than or equal to 20%, e.g. lying in the range 20% to 40%. The invention may advantageously enable suspensions to be used that are relatively highly filled with solid particles, since even though such suspensions present relatively high viscosity, it is nevertheless possible to perform impregnation with suspensions of this type by increasing the speed of rotation of the mold.

In known manner, the first suspension and/or the second suspension may include an organic binder.

In a variant that is not shown, it is possible to use a single mold to impregnate a plurality of hollow fiber textures simultaneously with the same suspension of solid particles or with different suspensions. Under such circumstances, at least one separation wall is present in the inside volume of the mold, the separation wall defining two distinct treatment chambers, the fiber texture being present in each of the treatment chambers.

FIG. 3 shows a spray device 7 presenting a uniform distribution of orifices 8, these orifices 8 all being of the same size. Naturally, it would not go beyond the ambit of the invention if this were not the case. Specifically, in a variant, the spray device may present a first set of orifices presenting a first size and a second set of orifices presenting a second size different from the first. The first set of orifices may be situated in a first region of the spray device that is different or disjoint from a second region of the spray device in which the second set of orifices is situated. The first and second regions may be offset along the axis of rotation X. For example, the first size may be greater than the second size, and the first set of orifices may be situated facing a zone of the fiber texture that is of diameter greater than the diameter of the zone of the fiber texture situated facing the second set of orifices. In a variant, the orifices of the first set and the orifices of the second set may be intermingled in the surface of the spray device.

In a variant or in combination with the above characteristics concerning the size of the orifices, the density of the orifices may be varied on going along the surface of the spray device. Thus, in a first region, the spray device may present orifices at a first density while, in a second region different from the first, it may present orifices at a second density different from the first. The first and second regions may be offset along the axis of rotation X. For example, the first density may be greater than the second density and the first region may be situated facing the zone of the fiber texture that is of diameter greater than the diameter of the zone of the fiber texture situated facing the second region.

In a variant or in combination with the above characteristics, the geometrical distribution of the orifices of the spray device may vary on going along the axis of rotation X, it being possible for the orifices to be arranged in a staggered configuration, for example.

In an implementation, a layer of porous material (not shown) may be present between the outer face 1b of the fiber texture 1 and the side wall 3 of the mold. This layer of porous material may serve to drain the liquid medium of the suspension(s) introduced into the fiber texture while retaining the solid particles that have been introduced inside the fiber texture. By using a layer of porous material that enables the liquid medium to be drained selectively, it is possible to obtain an accumulation of solid particles in the fiber texture and thus to increase the volume percentage of the matrix obtained once the method has been performed.

Once impregnating the fiber texture is finished, the liquid medium of the first suspension, and possibly of the second suspension, is eliminated. This may be done by heating or by suction (applying a vacuum). The mold may thus be provided with a heater member or it may be placed in a heated enclosure, or indeed it may be connected to a pumping device for sucking out the liquid medium.

It is then possible to obtain a part made of composite material in which the fiber texture constitutes the fiber reinforcement by forming a densification matrix phase, e.g. by sintering the solid particles present in the fiber texture. In a variant, for example if the solid particles that have been introduced are carbon particles, it is possible to form the matrix phase by infiltrating the fiber texture with a molten composition based on silicon so as to form a matrix phase of silicon carbide by reaction between the carbon introduced into the fiber texture and the molten silicon. This implementation in which a matrix phase is made by infiltrating a composition in the molten state may also be used when the solid particles introduced into the texture by centrifuging are ceramic particles, e.g. carbide and/or nitride particles.

Figure 7:
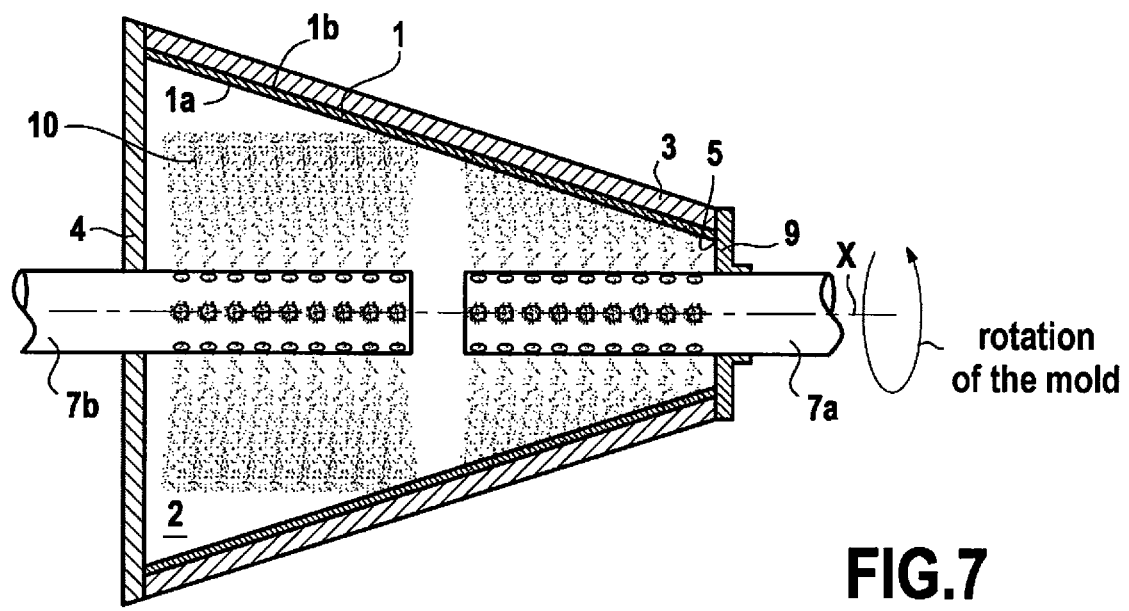
FIGS. 7 and 8 show how different variant steps of impregnating the fiber texture can be performed in the invention.

FIG. 7 shows a variant of the impregnation step of the invention in which two spray devices 7a and 7b are used. Each of the devices 7a and 7b is positioned at a respective opposite end of the mold. Such a configuration can be used in the context of the first implementation of the invention or of the second implementation of the invention.

In the same manner as described above, the device 7a and/or the device 7b may be caused to move in rotation and/or in translation during impregnation.

Figure 8:
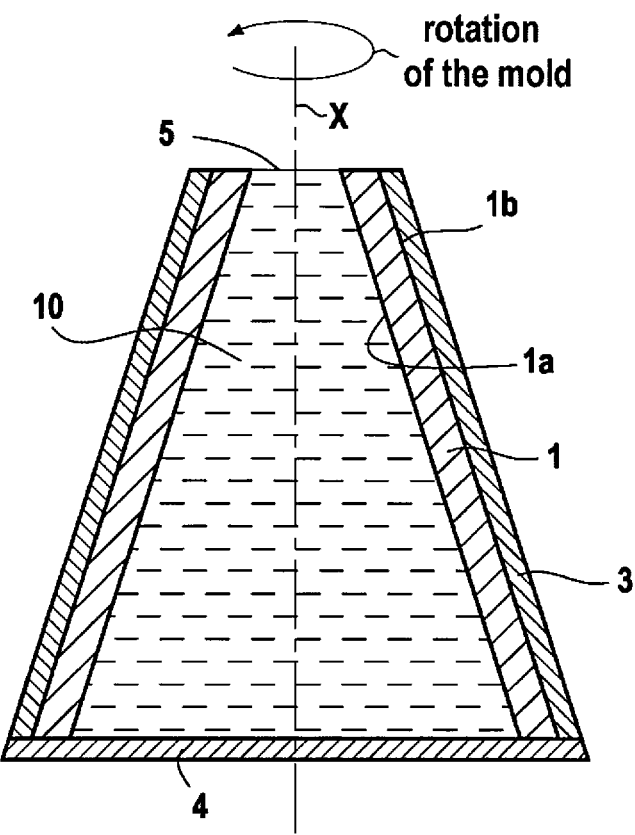

FIG. 8 shows a variant of the impregnation method of the invention. In the example shown in FIG. 8, the first suspension 10 is introduced by being poured into the inside volume. The suspension is introduced through the end 5 that is situated remote from the end wall 4 of the mold. The mold is then caused to rotate as described in detail above so as to impregnate the texture 1 at least with the first suspension 10. In the example shown in FIG. 8, it is possible to pour a first fraction of the first suspension into the inside volume and then set the mold into rotation in order to impregnate the texture 1 with said first fraction, and then to pour a second fraction of the first suspension into the inside volume in order to impregnate the texture 1 during rotation of the mold with said second fraction. In a variant, or in combination, after impregnating the texture 1 with the first suspension 10, it is possible to pour the second suspension into the inside volume and to impregnate the texture 1 with the second suspension as a result of the mold rotating. As shown in FIG. 8, the first suspension, and optionally the second suspension, as introduced into the mold can fill the inside volume substantially in full.

EXAMPLE

A fiber texture of frustoconical shape presenting a small diameter of 20 centimeters (cm) and a large diameter of 40 cm and made of "Nextel 610" alumina fibers from the supplier 3M was placed in a mold. As shown in FIG. 1, the outer face of the texture was placed facing a side wall of the mold, the inside face of the texture defining an inside volume. A suspension of a powder of aluminum of SM8 type occupying 20% by volume was introduced into the inside volume. In order to perform impregnation, the speed of rotation of the mold was initially set at 1500 rpm for 30 minutes (min), and then the speed of rotation was reduced to 750 rpm and maintained at this new speed of rotation for 30 min.

Once the fiber texture was impregnated, the liquid medium of the suspension was eliminated by evaporation under a vacuum at a pressure less than or equal to 20 millibars (mbar). The particles of alumina were then sintered. The volume of suspension that was introduced was selected so that after sintering the part obtained had a fiber volume fraction of about 50% and a matrix volume fraction of about 32%.

The term "lying in the range . . . to . . . " should be understood as including the bounds.

The invention claimed is:

1. A method of impregnating a fiber texture of hollow shape, the method comprising:
   introducing a first suspension containing a first powder of solid particles of ceramic or carbon material, into an inside volume defined by an inside face of a fiber texture of hollow shape placed in a mold, an outer face of the fiber texture being presented facing a wall of the mold, wherein the first suspension is introduced into the inside volume by spraying through orifices of a spray device, and wherein the spray device has regions wherein the orifices are present at different densities; and
   using the action of centrifugal force to impregnate the fiber texture with the first suspension by causing the mold to rotate and varying the speed of rotation of the mold during the impregnation of the fiber texture with the first suspension,
   wherein the fiber texture is of frustoconical shape and extends from a first distal end to a second distal end, the first distal end defining a first opening that is larger than a second opening defined by the second distal end, the fiber texture tapering continuously from the first distal end to the second distal end,
   wherein the fiber texture is impregnated with the first suspension by initially imparting a first constant speed of rotation to the mold and then impregnation with the first suspension is continued by subsequently imparting a second constant speed of rotation to the mold, the second constant speed of rotation being different from the first constant speed of rotation,
   wherein the first constant speed of rotation is higher than the second constant speed of rotation,
   wherein during impregnation of the fiber texture with the first suspension, the speed of rotation of the mold is reduced from the first constant speed of rotation to the second constant speed of rotation without stopping the mold, and
   wherein a duration during which the first constant speed of rotation is imparted is different from a duration during which the second constant speed of rotation is imparted.

2. A method of impregnating a fiber texture of hollow shape, the method comprising:
   introducing a first suspension containing a first powder of solid particles of ceramic or carbon material, into an inside volume defined by an inside face of a fiber texture of hollow shape placed in a mold, an outer face of the fiber texture being presented facing a wall of the mold, the fiber texture being of frustoconical shape; and
   using the action of centrifugal force to impregnate the fiber texture with the first suspension by causing the mold to rotate and varying the speed of rotation of the mold during the impregnation of the fiber texture with the first suspension,
   wherein the fiber texture is impregnated with the first suspension by initially imparting a first constant speed of rotation to the mold and then subsequently imparting a second constant speed of rotation to the mold, the second constant speed of rotation being different from the first constant speed of rotation,
   wherein the fiber texture that is of frustoconical shape extends from a first distal end to a second distal end, the first distal end defining a first opening that is larger than a second opening defined by the second distal end, the fiber texture tapering continuously from the first distal end to the second distal end,
   wherein the first constant speed of rotation is higher than the second constant speed of rotation,
   wherein during impregnation of the fiber texture with the first suspension, the speed of rotation of the mold is reduced from the first constant speed of rotation to the second constant speed of rotation without stopping the mold, and
   wherein a duration during which the first constant speed of rotation is imparted is different from a duration during which the second constant speed of rotation is imparted.

3. A method according to claim 2, wherein the direction of rotation of the mold is reversed one or more times during impregnation of the fiber texture with the first suspension and/or during impregnation of the fiber texture with a second suspension.

4. A method according to claim 2, wherein the first and/or a second suspension is introduced into the inside volume by spraying through one or more spray devices, the one or more spray devices being driven to move in translation and in rotation during the spraying.

5. A method according to claim 2, wherein the fiber texture is axisymmetric.

6. A method according to claim 2, wherein the fiber texture is obtained by two-dimensional weaving or by three-dimensional weaving.

7. A method according to claim 2, wherein the fiber texture includes ceramic yarns of refractory oxide and wherein the particles of the first powder are ceramic particles of refractory oxide.

8. A method of fabricating a composite material part, the method comprising:
   impregnating the fiber texture with at least the first suspension by performing a method according to claim 1;
   eliminating at least a liquid medium of the first suspension impregnating the fiber texture; and
   forming a matrix phase densifying the fiber texture at least from the particles of the first powder in order to obtain the composite material part.

9. A method according to claim 8, wherein the matrix phase is formed in full or in part by sintering the particles of the first powder.

10. A method according to claim 2, wherein the first constant speed of rotation is maintained for a duration greater than the duration during which the second constant speed of rotation is maintained.

11. A method according to claim 2, wherein the first and second constant speeds of rotation are selected to obtain a distribution of the solid particles inside said fiber texture that is uniform.

12. A method according to claim 2, wherein the first and second constant speeds are selected to obtain a predetermined distribution of the solid particles inside said fiber texture.

13. A method according to claim 2, wherein the first constant speed of rotation is selected to impart sufficient centrifugal force to the first suspension so that the solid particles migrate through the fiber texture into an outer zone of a thickness of the fiber texture and the second constant speed of rotation is selected so that the solid particles migrate into an inner zone of the thickness of the fiber texture.

* * * * *